UNITED STATES PATENT OFFICE.

EDWARD RECORDS, OF NEW YORK, N. Y., ASSIGNOR TO JAMES B. DILL, OF SAME PLACE.

PROCESS OF MAKING FERTILIZERS.

SPECIFICATION forming part of Letters Patent No. 527,810, dated October 23, 1894.

Application filed February 10, 1894. Serial No. 499,769. (No specimens.)

*To all whom it may concern:*

Be it known that I, EDWARD RECORDS, a citizen of the United States, and a resident of New York, in the county of New York, State of New York, have invented a certain new and useful Improvement in Processes of Manufacturing Fertilizers, of which the following is a specification.

My invention relates to processes of manufacturing fertilizers and especially to the manufacture of such fertilizers as are compounded of calcareous marl and the blood, tankage or offal of animals.

My invention proceeds upon the application of two discoveries which I have made relating to the action of calcareous marl upon the offal, tankage or blood of animals, and to the fixing of the nitrogenous compounds of the said animal matters in the fertilizer; that is to say, I have discovered in the first place, that calcareous marl when dry, and especially in a pulverized condition, has the property of absorbing blood, and of disintegrating the more solid parts of the tankage and offal, and of fixing the nitrogenous parts of the blood, tankage or offal, so that the water may be evaporated without the loss of the nitrogenous compounds, for I have found, by actual experiments, in the manufacture of my fertilizer, that when chunks of bone are placed in powdered marl with moisture, as when blood is present, the chunks of bone are disintegrated and go to a powder. The disintegration takes place in a comparatively short time and the bone becomes like ground bone. In fact, it practically disappears as an integral substance. Thus simply by treating the said animal matters with the calcareous marl so as to mix them together and drying the mixture a very good fertilizer is obtained, the nitrogen being, as before said, retained and fixed in the mixture by the action of the calcareous marl upon the said animal matters.

In the second place I improve my process of manufacture by treating the fertilizing material with acids, especially sulphuric acid after the blood, tankage or offal has been mixed with the calcareous marl. When so added the sulphuric acid fixes the ammonia very permanently in the fertilizer. When so added the sulphuric acid combines with the ammonia and also fixes it very permanently in the fertilizer.

My process is operated as follows: In the first place, in operating with the said animal matters and calcareous marl alone, I first thoroughly dry the calcareous marl, which is best effected by artificial heat, and reduce the same to a rather finely pulverized condition. I then spread a layer of the calcareous marl thus dried and pulverized on a floor, say a ton of the marl in the layer, and then spread on the marl about an equal weight of blood, tankage or offal, preferably using the blood, tankage or offal of cattle, sheep or swine, although those of any other animals will serve the purpose. The blood is quickly absorbed by the calcareous marl, and the more solid parts of the tankage and offal are soon disintegrated thereby, and a sufficiently good mixture is obtained without stirring. At this stage of the process the marl fixes the ammonia of the blood, tankage or offal more or less firmly in the mass. The water is then to be evaporated, the drying of the mixture being hastened, if desired, by artificial heat. At the end of this stage of the process, a compound is obtained containing only a moderate percentage of nitrogen, and suitable for ordinary commercial fertilizers; but in order to increase the percentage of nitrogen I proceed as follows: After the mixture is dried to such a degree that the marl will absorb more blood and disintegrate more of the solid offal, another portion of the blood, offal, or tankage, about equal in weight to the first, is added, and the processes of absorption, disintegration and fixing the nitrogen are repeated. Again the mixture is sufficiently dried to enable the marl to take up more of the said animal matter, then again dried after such further portions of animal matter are added to the mixture, resulting from the preceding additions of the animal matter, and so the alternate adding of the animal matters and drying proceeds until the marl will not take up any more of the animal matter. Then the mixture is finally dried, which is most expeditiously done by artificial heat, and is ready to be packed and shipped.

It will be readily understood, that each addition of blood, tankage or offal results in increasing the percentage of ammonia in the fertilizer, and a very rich and valuable fertilizer is finally obtained.

While, as hereinbefore said, I produce a serviceable fertilizer from the treatment of marl with blood, tankage or offal, I prefer to treat the mixtures resulting from the successive additions of the blood, tankage or offal, to the marl with sulphuric acid, in the following manner: I proceed with the successive additions of the said animal matters to the calcareous marl as hereinbefore described, until the desired percentage of nitrogen is attained. When this stage is reached, I spread over the mixture a quantity of commercial sulphuric acid, in weight from five to ten per cent. of the total weight of the marl and animal matters, less the water evaporated during the previous steps of process. The sulphuric acid converts the ammonia into a stable compound, and thus fixes them in the fertilizer. The composition is then finally dried and is packed ready for shipping.

While I prefer to use sulphuric acid to fix the nitrogen, I do not restrict myself thereto, but can also employ any other acid which produces a similar result; also while the said proportions of marl and animal matters, as well as of sulphuric acid are such as give excellent results in practice, such proportions may be varied from without departing from my essential invention.

Now, having described my improvements, I claim as my invention—

1. The process of disintegrating the solid parts of the tankage and offal of animals, such as the viscera and bones, by mixing the same without pulverizing with powdered marl, substantially as described.

2. The process of making fertilizers hereinbefore described, consisting in drying and pulverizing calcareous marl, adding blood, tankage or offal to the marl, drying the mixture, and subsequently alternately adding more blood, tankage or offal to the original mixture and drying the mass.

3. The process of making fertilizers hereinbefore described, consisting in drying and pulverizing calcareous marl, adding blood, tankage or offal thereto, and ultimately adding sulfuric acid to the mixture, whereby the ammonia of the blood, tankage or offal is converted into a stable compound.

In testimony that I claim the foregoing as my invention I have signed my name, in presence of two witnesses, this 7th day of February, 1894.

EDWARD RECORDS.

Witnesses:
  ISIDORE GASSET,
  DAVID WALTER BROWN.